(12) United States Patent
Paik et al.

(10) Patent No.: US 8,836,765 B2
(45) Date of Patent: Sep. 16, 2014

(54) APPARATUS AND METHOD FOR GENERATING A FULLY FOCUSED IMAGE BY USING A CAMERA EQUIPPED WITH A MULTI-COLOR FILTER APERTURE

(75) Inventors: Joon-Ki Paik, Seoul (KR); Sang-Jin Kim, Seoul (KR); Eun-Sung Lee, Seoul (KR)

(73) Assignee: Chung-Ang University Industry-Academy Cooperation Foundation, Seoul (KR)

(*) Notice: Subject to any disclaimer, the term of this patent is extended or adjusted under 35 U.S.C. 154(b) by 235 days.

(21) Appl. No.: 13/290,930

(22) Filed: Nov. 7, 2011

(65) Prior Publication Data
US 2012/0113227 A1    May 10, 2012

Related U.S. Application Data

(60) Provisional application No. 61/410,423, filed on Nov. 5, 2010.

(51) Int. Cl.
*H04N 13/02* (2006.01)
*H04N 5/232* (2006.01)
*H04N 9/04* (2006.01)

(52) U.S. Cl.
CPC .......... *H04N 9/045* (2013.01); *H04N 5/23212* (2013.01)
USPC ............................................ 348/46; 348/135

(58) Field of Classification Search
USPC ..................................................... 348/46, 135
See application file for complete search history.

(56) References Cited

U.S. PATENT DOCUMENTS

| | | | |
|---|---|---|---|
| 2004/0017579 A1* | 1/2004 | Lim | 358/1.9 |
| 2010/0100924 A1* | 4/2010 | Hinton | 726/1 |
| 2011/0018974 A1* | 1/2011 | Wang | 348/49 |
| 2012/0069320 A1* | 3/2012 | Simonov et al. | 356/4.04 |

\* cited by examiner

*Primary Examiner* — Sath V Perungavoor
*Assistant Examiner* — Jeffery Williams
(74) *Attorney, Agent, or Firm* — William Park & Associates Ltd.

(57) ABSTRACT

Provided are an apparatus and method for generating a fully focused image. A depth map generation unit generates a depth map of an input image obtained by a multiple color filter aperture (MCA) camera. A channel shifting & alignment unit extractes subimages which include objects with same focal distance based on the depth map, and performing color channel alignment and removing out-of-focus blurs for each subimages obtained from the depth map. An image fusing unit fuses the subimages to generate a fully focused image.

9 Claims, 8 Drawing Sheets
(3 of 8 Drawing Sheet(s) Filed in Color)

APPARATUS AND METHOD FOR GENERATING A FULLY FOCUSED IMAGE BY USING A CAMERA EQUIPPED WITH A MULTI-COLOR FILTER APERTURE

CROSS-REFERENCE TO RELATED APPLICATION

This application claims the benefit of U.S. Provisional Application No. 61/410,4230, filed Nov. 5, 2011, the contents of which are hereby incorporated by reference

BACKGROUND

The present invention relates to an apparatus and method for generating a fully focused image and, more particularly, to an apparatus and method for generating a fully focused image by using a camera equipped with a multi-color filter aperture.

Demand for digital auto-focusing techniques is rapidly increasing in many visual applications, such as camcorders, digital cameras, and video surveillance systems. Conventional cameras have come a long way in dealing with problems associated with focal settings and blur. Even though several steps have been taken, focal blur caused by varying distance of the object from the lens has been something that the conventional cameras still have to deal with. With focus set at near, mid or far regions of the scene, the captured image tends to have only that particular region in focus where as the remaining regions tend to be in out-of-focus. To solve this problem, post-processing steps in the form of blur restoration and multiple image fusion have been proposed to deal with the focusing problem.

Recently computational cameras have been developed that are capable of capturing additional information from the scene which when combined with post-processing can overcome several drawbacks of the imaging applications including: refocusing, increased dynamic range, depth-guided editing, variable lighting and reflectance, and so on.

The idea of using a multiple aperture lens has been previously proposed using micro lens array and wave front coding. However, the quality of images obtained by these optical designs is fundamentally inferior to a camera system with a large single lens. And, the resolution of these small lens arrays is severely limited by diffraction. More recent methods include single-lens multi-view image capture. This multiple filter aperture (FA) model uses parallax cues instead of defocus cues and requires only color filters as additional optical elements to the lens without requiring multiple exposures.

Meanwhile, extensive work has been done using fusion and restoration-based methods for removal of out-of-focus blur in images. Fusion algorithms using DCT, pyramids, and wavelets have been proposed to name a few where as restoration algorithms include blind de-convolution with no priori information as well as with PSF estimation.

Also, depth map algorithms have been extensively applied to stereo vision where the disparity estimate is computed as a correspondence measure through camera displacement. Shape from focus can also estimate depth from a sequence of images taken by a single camera at different focus levels. Shape from focus methods employ spatial criteria including gray level variance (GLV), sum modified Laplacian (SML), Tanenbaum, mean method, curvature focal measure, and so forth.

SUMMARY

The present invention is directed to providing an apparatus and method for generating a fully focused image which captured by a multiple color filter aperture camera.

The present invention is also directed to providing a non-transitory computer readable medium recording a program for executing in a computer a method for generating a fully focused image.

According to an aspect of the present invention, there is provided an apparatus for generating a fully focused image includes: a depth map generation unit generating a depth map of an input image obtained by a multiple color filter aperture (MCA) camera; a channel shifting & alignment unit extracting subimages which include objects with same focal distance based on the depth map, and performing color channel alignment and removing out-of-focus blurs for each subimages obtained from the depth map; and an image fusing unit fusing the subimages to generate a fully focused image.

According to another aspect of the present invention, there is provided a method for generating a fully focused image includes: (a) generating a depth map of an input image obtained by a multiple color filter aperture (MCA) camera; (b) extracting subimages which include objects with same focal distance based on the depth map; (c) performing color channel alignment and removing out-of-focus blurs for each subimages obtained from the depth map; and (d) fusing the subimages to generate a fully focused image.

BRIEF DESCRIPTION OF THE DRAWINGS

The patent or application file contains at least one drawing executed in color. Copies of this patent or patent application publication with color drawings(s) will be provided by the Office upon request and payment of the necessary fee. The above and other objects, features and advantages of the present invention will become more apparent to those of ordinary skill in the art by describing in detail exemplary embodiments thereof with reference to the accompanying drawings, in which.

DETAILED DESCRIPTION OF EMBODIMENTS

Hereinafter, an apparatus and method for enhancing image quality of an image according to exemplary embodiments will be described with reference to the accompanying drawings. Throughout the specification and claims, unless explicitly described to the contrary, the word "comprise" and variations such as "comprises" or "comprising", will be understood to imply the inclusion of stated elements but not the exclusion of any other elements. Terms such as 'unit', 'module', 'block', or the like, described in the specification may refer to a unit for processing at least one function or operation, which can be implemented by hardware, software, or a combination of hardware and software.

Figure 1:
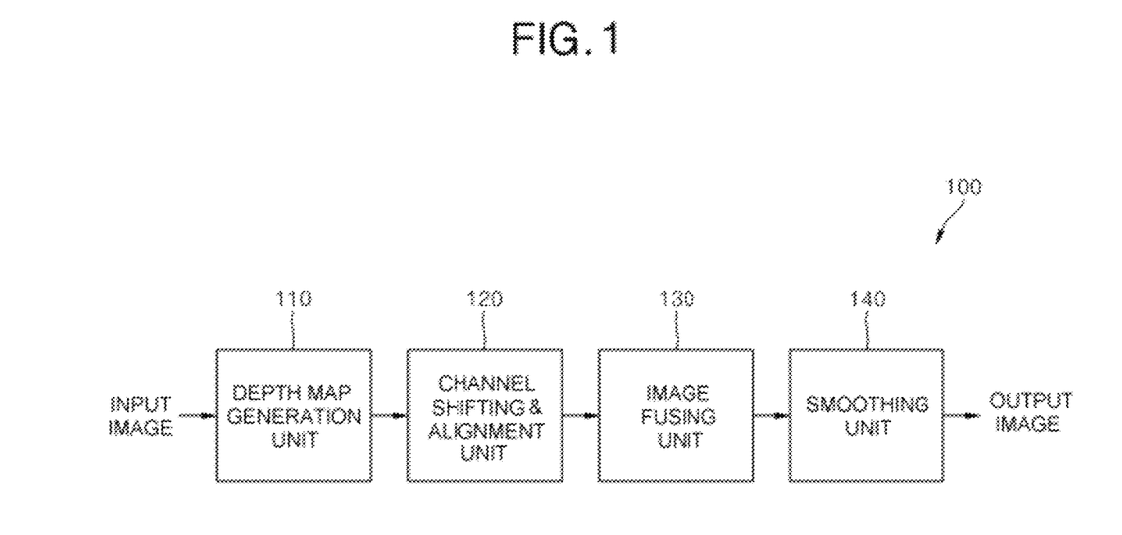
FIG. 1 is a block diagram showing the configuration of an apparatus for generating a fully focused image according to an exemplary embodiment.

FIG. 1 is a block diagram showing the configuration of an apparatus for generating a fully focused image according to an exemplary embodiment of the present invention.

Referring to FIG. 1, an apparatus for generating a fully focused image 100 includes a depth map generation unit 110, a channel shifting & alignment unit 120, an image fusing unit 130, and a smoothing unit 140.

Figure 2A:
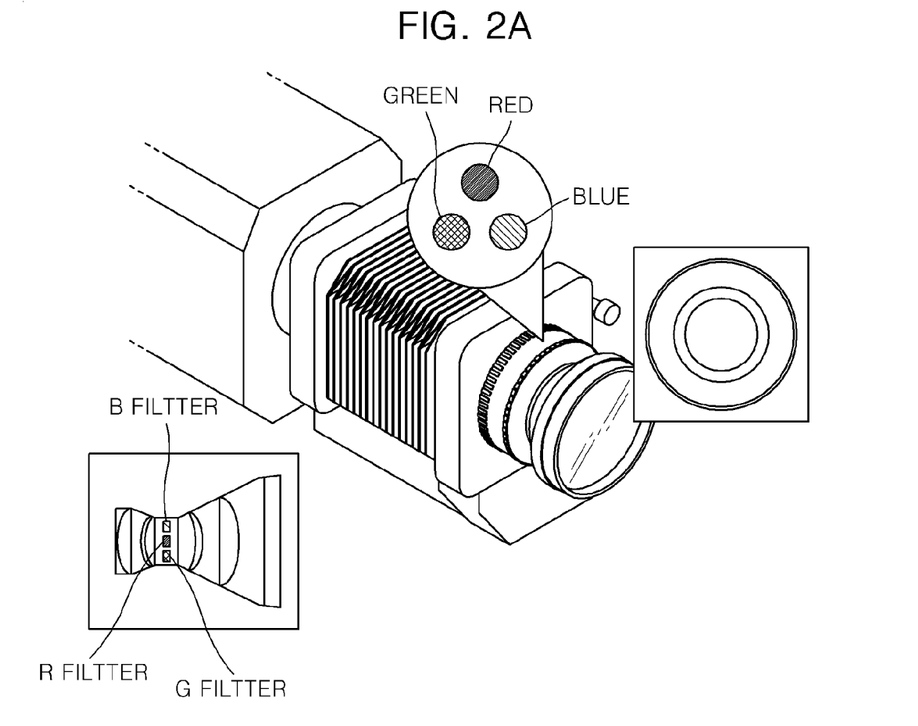
FIGS. 2A to 2D are input images and corresponding depth maps extracted using color channel dependency.
Figure 2B:
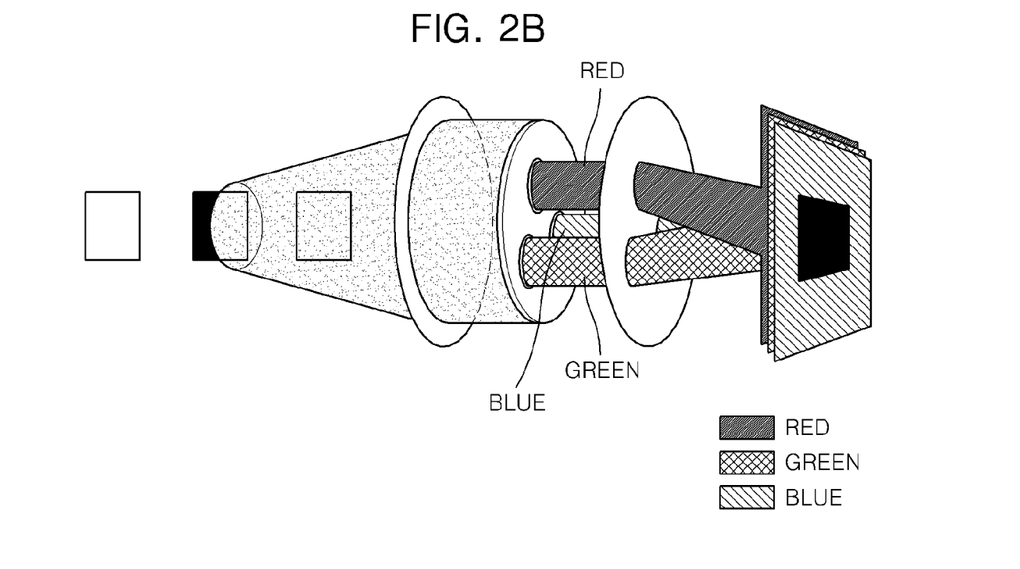
Figure 2C:
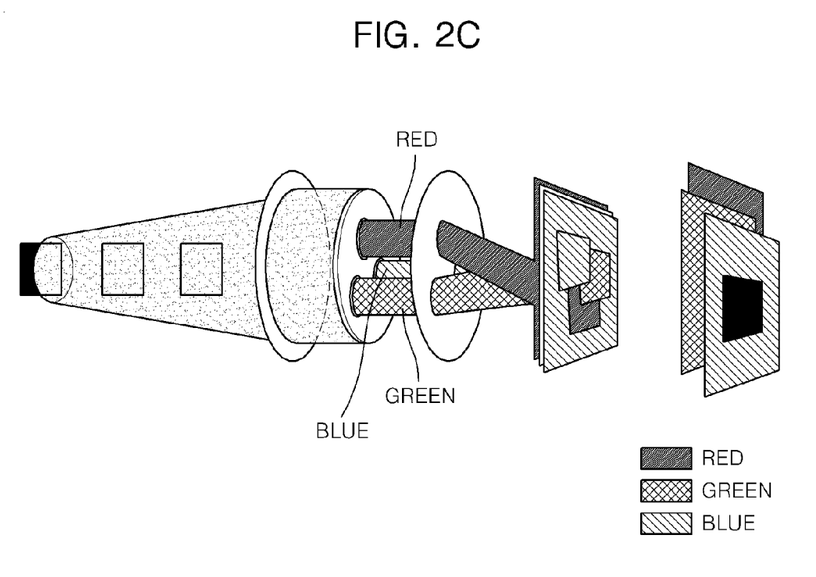
Figure 2D:
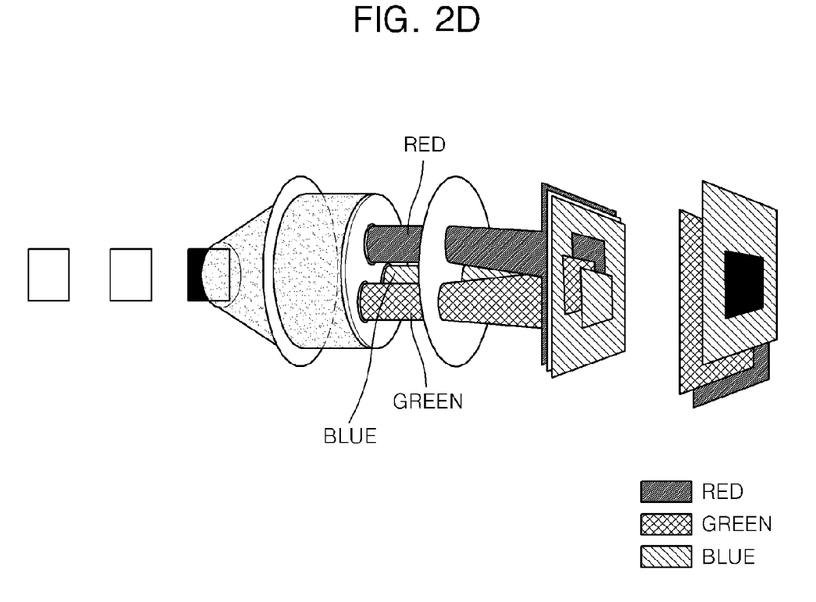

The depth map generation unit 110 generates a depth map of an input image obtained by the multiple color filter aperture (MCA) camera. FIGS. 2A to 2D are views for explaining images formed by using an aperture with three openings. As shown in FIG. 2A, the MCA camera uses three openings with R, G, and B filters. With reference to FIGS. 2B to 2D, a main advantage of the MCA camera is that it provides additional depth information which can be estimated from the direction and amount of color deviation from the optical axis. When an object is located on the out-focused position, the MCA camera results in out-of-focus blur as well as color shifting.

A fully focused image can be generated from n subimages using estimated depth map. To generate the depth map, the depth map generation unit 110 decomposes the input image into regions of homogeneous color. Here, the perimeter of the each region can be obtained from the edge information which in turn supports the disparity estimation. For this, we assume the pixel colors within a local window w(x,y) belong to one cluster and use the magnitude of the each cluster elongation as the correspondence measure. More specifically, we consider a set $P_1(x,y;d)$ of pixel colors with hypothesized disparity d as Equation 1 shown below:

$$P_1(x,y;d) = \{(I_{(R)}(s+d,t), I_{(G)}(s,t-d), I_{(B)}(s-d,t)) | (s,t) \in w(x,y)\} \quad \text{Equation 1}$$

Here, $I_{(R)}$, $I_{(G)}$, and $I_{(B)}$ represent red, green, and blue color channel images, respectively and (s+d,t), (s,t−d), and (s−d,t) are shift vectors for each color channel images.

And, the depth map generation unit 110 searches for d that minimizes the following Equation 2 shown below for color alignment measure:

$$L(x,y;d) = \lambda_0 \lambda_1 \lambda_2 / \sigma_r^2 \sigma_g^2 \sigma_b^2 \quad \text{Equation 2}$$

Here, $\lambda_0$, $\lambda_1$, and $\lambda_2$ represent the eigenvalues of the covariance matrix $\Sigma$ of the color distribution $P_1(x,y;d)$, respectively, and $\sigma_r^2$, $\sigma_g^2$, and $\sigma_b^2$ are the diagonal elements of the covariance matrix $\Sigma$.

From Equations 1 and 2, the depth map generation unit 110 can obtain an abstract disparity map in the predetermined disparity search range (for example, [−10, 10]) which can be used to develop the error energy matrix and calculate the depth map. However, the depth map extracted using the above-mentioned method alone is insufficient for the proper extraction of focus maps needed to generate the fully focused image. Hence, segmentation as an additional criterion for more accurate extraction of the depth map $\alpha(x,y)$ as the following Equation 3:

$$\alpha(x,y) = L(x,y) \cap M(x,y) \quad \text{Equation 3}$$

Here, M(x,y) represents the mean-shift segmentation result.

Figure 3A:
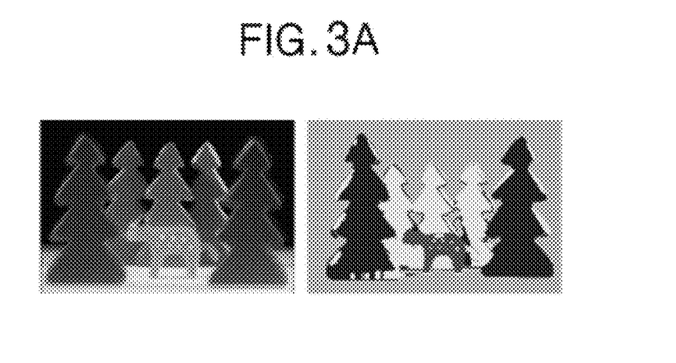
FIGS. 3A to 3C are views for explaining images formed by using an aperture with three openings.
Figure 3B:
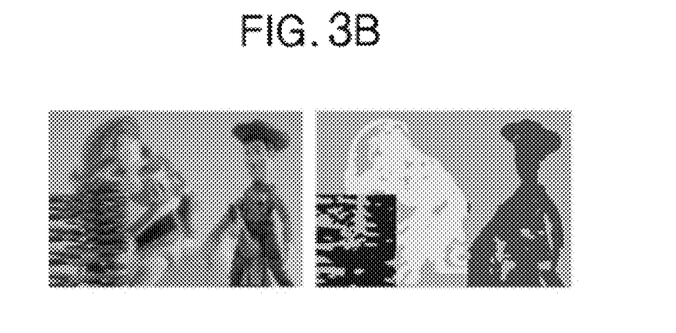
Figure 3C:
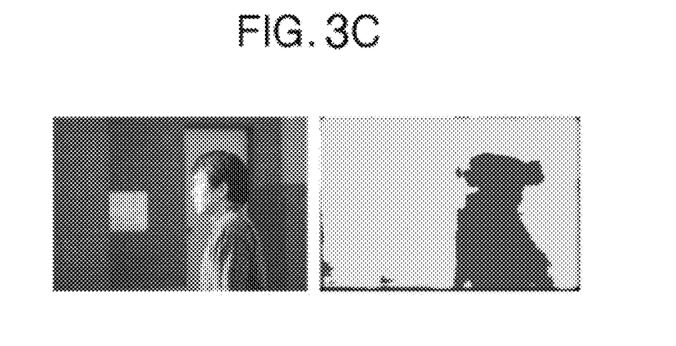

FIGS. 3A to 3C are input out-of-focus images captured using the MCA camera and corresponding depth maps extracted using color channel dependency.

Referring to FIGS. 3A to 3C, each input image shown left in each figure is focused at one object, that is deer, spring, and man, respectively. Therefore, other objects in each image suffer from out-of-focus blurs. The depth maps shown right in each figure are composed of several objects of which colors are different. In the depth map, objects having same color are assumed to be same distance from the lens of the MCA camera.

Figure 4:
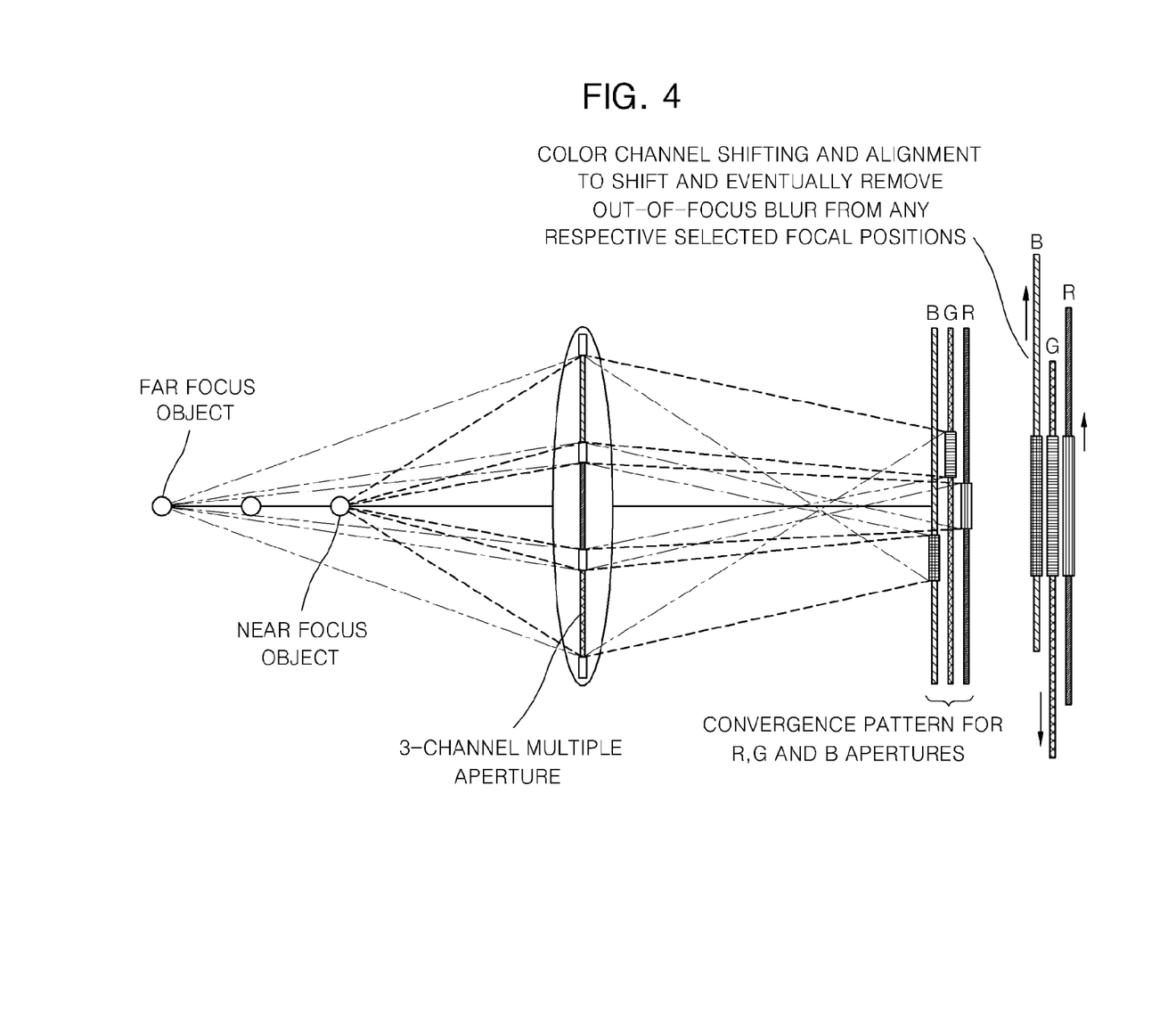
FIG. 4 is a schematic and functional illustration of the multiple filter aperture model.

The channel shifting & alignment unit 120 performs color channel alignment and remove the out-of-focus blur for each subimages obtained from the depth map. When the center of the aperture is not aligned on the optical axis, convergence is made off the optical axis, whose specific location depends on the distance between the lens and an object. The R, G, and B filters on FA are arranged so that their displacement with respect to center of the lens aligns with the row column displacement of the image sensor as shown in FIG. 4. Referring to FIG. 4, for objects located at near-, far-, and in-focused distance, the convergence pattern is split into three channels, thereby, retaining the information of circle of confusion (COC) or point spread function (PSF) within the corresponding color plane.

By this arrangement, a scene point nearer or farther than the focused depth is captured as shift in R, G and B channels. The main advantage of the FA model is that it can provide an alternative method for the blur estimation in auto-focusing applications. Images acquired by using a conventional optical system have defocusing blur caused by a specific PSF. On the other hand the proposed multiple FA model the auto-focusing problem turns in to the alignment of R, G, and B channels with various depths of field. For shifting and aligning color channels we need to find the optimal pixel-of-interest (POI) at different positions in the image according to their focal measures. The POI can be referred to as a focal point pixel, around which channel shifting and alignment is carried out. For a given region, we then select the focal point pixel either from the center of the region or the pixel with the lowest focus measure. Similar operations repeat for differently selected focal point regions.

For a given particular image acquired by using the MCA camera configured as shown in FIG. 4, the out-of-focus blur was just confined to channels on either side of the green, thereby, suffering minimal distortion due to the central sensor position whereas the red and the blue channels have maximal blur distortion. Therefore, the green channel can be used as the reference and the red and the blue channels can be aligned to the green by using Equation 4:

$$I_{(R,G,B)} = [S_{(r,c)}(I_{(R)}, I_{(B)}), I_{(G)}] \quad \text{Equation 4}$$

Where, $I_{(R,G,B)}$ represents the input image and $S_{(r,c)}$ represents the shift operator of the corresponding shift vector (r,c) that represents the amount of shift in row and column directions for the respective red and blue channels with respect to the reference focal point on the green channel.

If the shift vectors are not identical, Equation 4 can be generalized as follow:

$$I_{(R,G,B)} = [S_{(r1,c1)}(I_{(R)}), \epsilon_{(r2,c2)}(I_{(B)}), I_{(G)}] \quad \text{Equation 5}$$

Where, $I_{(R,G,B)}$ represents the input image and $S_{(r1,c1)}$ and $S_{(r2,c2)}$ represent the shift operators of the corresponding shift vectors $(r_1,c_1)$ for red channel and $(r_2,c_2)$ for blue channel.

According to Equation 5, for aligning blue channel with green channel, the pixels have to be shifted in upward direction and toward left or diagonally to left and vice versa for red channel.

In the meantime, the input image can be represented as follow:

$$I_{(R,G,B)} = \{I_{(R_1,G_1,B_1)}^{fp1}, \ldots, I_{(R_n,G_n,B_n)}^{fpn}\} \quad \text{Equation 6}$$

Where, $I_{(R,G,B)}$ represents the input image and $I_{(R_1,G_1,B_1)}^{fp1}, \ldots, I_{(R_n,G_n,B_n)}^{fpn}$ represent subimages at varying focal points.

The channel shifting & alignment unit 120 extracts subimages based on the depth map. Each subimage includes objects which have same focal distance, that is to say, which have same color in the depth map. And the channel shifting & alignment unit 120 aligns two color channels (red and blue) to a reference color channel (green) for each subimage. For this, the channel shifting & alignment unit 120 obtains fully focused subimages by using Equation 7 based on the depth map.

$$(I_{(R_1,G_1,B_1)}^{FR1}, \ldots, I_{(R_n,G_n,B_n)}^{FRn}) = (L,M) \subset (I_{(R_1,G_1,B_1)}^{fp}1, \ldots, I_{(R_n,G_n,B_n)}^{fpn})$$ Equation 7

Where, $I_{(R_1,G_1,B_1)}^{FR1}, \ldots, I_{(R_n,G_n,B_n)}^{FRn}$ represent fully focused subimages.

The image fusing unit 130 fuses subimages to generate a fully focused image. For this, the image fusing unit 130 combines different regions from different channel shifted regions using the depth map information as follow:

$$I_{(R,G,B)}^F = (I_{(R_1,G_1,B_1)}^{FR1} + \ldots + I_{(R_n,G_n,B_n)}^{FRn})$$ Equation 8

Where, $I_{(R,G,B)}^F$ represents the fully focused image.

The smoothing unit 140 divides the image into a high frequency region and a low frequency region by using a spatially adaptive noise smoothing algorithm based on an alpha map in order to enhance image quality of the fully focused image.

Figure 5:
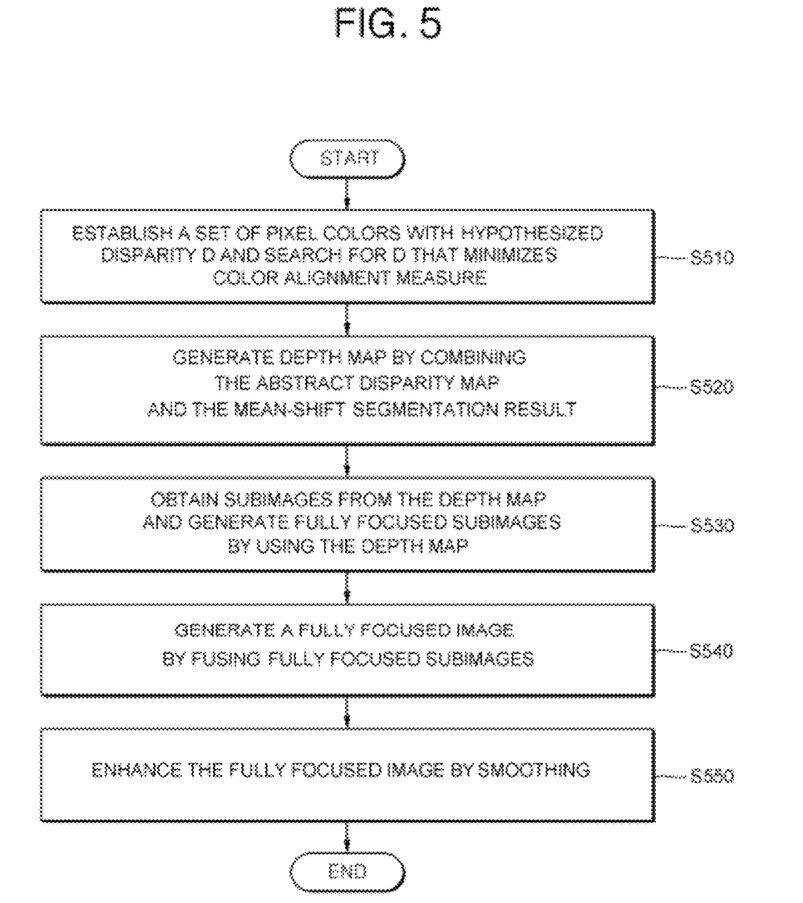
FIG. 5 is a flow chart illustrating the process of a method for generating a fully focused image according to an exemplary embodiment.

FIG. 5 is a flow chart illustrating the process of a method for generating a fully focused image according to an exemplary embodiment.

Referring to FIG. 5, the depth map generation unit 110 establishes a set of pixel colors with hypothesized disparity d and searches for d that minimizes color alignment measure by using Equations 1 and 2 in step S510. Next, the depth map generation unit 110 generates depth map by combining the abstract disparity map and the mean-shift segmentation result by using Equation 3 in step S520. Next, the channel shifting & alignment unit 120 obtains subimages from the depth map and generate fully focused subimages by using the depth map by using Equation 7 in step S530. Next, the fusing unit 130 generates a fully focused image by fusing fully focused subimages in step S540. Finally, the smoothing unit 140 enhances the quality of the fully focused image by smoothing in step S550. The step S550 can be omitted.

Figure 6:
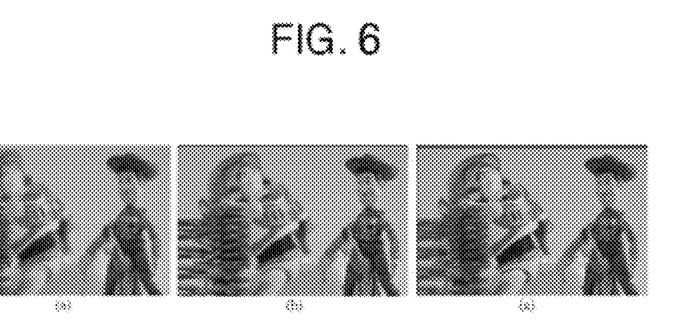
FIGS. 6A to 6C are input images with different focal lengths.
Figure 7A:
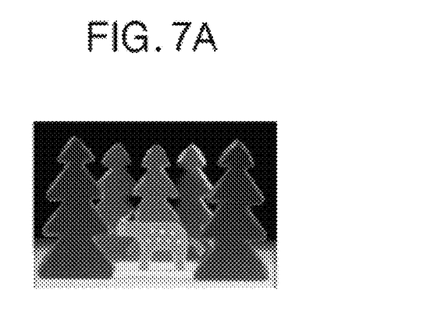
FIGS. 7A to 7C are fully focused images obtained by using the method according to an exemplary embodiment from input images shown in FIGS. 3A to 3C.
Figure 7B:
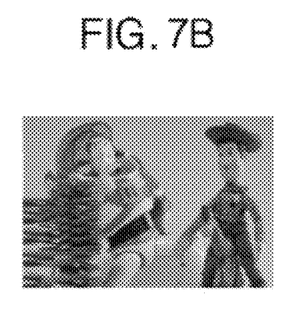
Figure 7C:
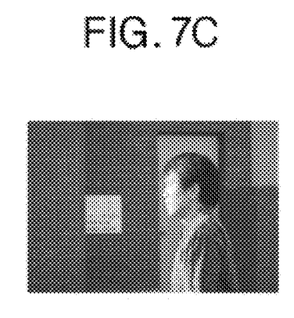

For the experiments, a commercial gelatin filter (Kodak-Wratten Filter—G-58, B-47, and R-25) with sensors representing red, green, and blue spectral wavelengths is used. FIG. 6(a) represents a typical FA multiple object image captured with focus on 'spring' object on left. FIGS. 6(b) and 6(c) represent channel shifting performed to shift the focus from 'spring' to 'cowboy' followed by 'robot' using FIG. 6(a). In order to combine FIGS. 6(a)-6(c) to a single image with full focus the depth map estimation has been used as shown in FIGS. 3A to 3C. By using the generated depth map we can extract boundary of each object which in turn retrieve and combine pixels from various channel shifted images shown in FIGS. 7A to 7C, of which input images and corresponding depth maps are shown in FIGS. 3A to 3C, respectively.

The result of the present invention was compared against standard restoration and fusion-based methods as shown in Table 1.

TABLE 1

| AF method | Priori | Mode | Input | Operation | RMSE | PSNR |
|---|---|---|---|---|---|---|
| Wiener Filter | PSF | Gray | 1 | Pixel | 12.35 | 23.36 |
| Iterative Filter | NIL | Gray | 1 | Pixel | 8.56 | 26.32 |

TABLE 1-continued

| AF method | Priori | Mode | Input | Operation | RMSE | PSNR |
|---|---|---|---|---|---|---|
| Pyramid Fusion | NIL | Gray, Color | At least 2 | Window and Pixel | 5.68 | 28.42 |
| Wavelet Fusion | NIL | Gray, Color | At least 2 | Window and Pixel | 5.02 | 29.95 |
| Present Invention | NIL | Color | 1 | Window and Pixel | 8.06 | 26.41 |

Another comparison in the sense of pixel error count (PEC) and disparity error map (DEM) are shown in Tables 2 and 3. PEC is obtained by calculating the number of mis-classified pixels with ground truth segmentation map. Shape from focus measures including sum modified Laplacian (SML), gray level variance (GLV), Tanenbaum and Tanengrad were used in PEC comparison.

TABLE 2

| Test | SML | Tanenbaum | GLV | Tenengrad | Present Invention |
|---|---|---|---|---|---|
| Deer | 1.05 | 0.95 | 1.35 | 0.99 | 0.52 |
| Toys | 0.99 | 0.61 | 1.30 | 0.93 | 0.41 |
| Sim | 1.12 | 0.82 | 1.17 | 0.91 | 0.50 |
| Doll | 0.82 | 0.67 | 1.03 | 0.68 | 0.49 |

TABLE 3

| Test | SAD | GRAD | Color | Bayes | Present Invention |
|---|---|---|---|---|---|
| Deer | 14.56 | 12.10 | 7.20 | 6.30 | 6.50 |
| Toys | 18.31 | 14.32 | 8.60 | 8.40 | 6.21 |
| Sim | 12.08 | 11.47 | 7.01 | 5.64 | 5.40 |
| Doll | 12.32 | 12.19 | 9.18 | 7.82 | 6.11 |

It can be seen that the proposed depth map had comparable results with Tanenbaum for PEC but outperforming other measures significantly. The DEM was used to find the disparity error average for pre-defined range [−10 10] when compared with ground truth data. Stereo vision methods including sum and gradient absolute differences (SAD and GRAD), color and Bayes disparity were tested. In case of DEM the performance showed vast improvements over SAD and GRAD measures whereas comparatively competitive with color and Bayes disparity.

The present invention is ideal for situations when the focal range of a scene is distributed over varying distance from the camera.

The present invention can be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

Although the apparatus and method for generating a fully focused image captured by using MCA camera have been described with reference to the specific embodiments, they are not limited thereto. Therefore, it will be readily understood by those skilled in the art that various modifications and changes can be made thereto without departing from the spirit and scope of the present invention defined by the appended claims.

What is claimed is:

1. An apparatus for generating a fully focused image, the apparatus comprising:
    a depth map generation unit generating a depth map of an input image obtained by a multiple color filter aperture (MCA) camera;
    a channel shifting & alignment unit extracting subimages which include objects with same focal distance based on the depth map, and performing color channel alignment and removing out-of-focus blurs for each subimages obtained from the depth map; and
    an image fusing unit fusing the subimages to generate a fully focused image.

2. The apparatus of claim 1, wherein the depth map generation unit generates the depth map by establishing a set of pixel colors with hypothesized disparity d as Equation 1 shown below, and searches for d that minimizes an abstract disparity map represented by following Equation 2:

$$P_1(x,y;d) = \{(I_{(R)}(s+d,t), I_{(G)}(s,t-d), I_{(B)}(s-d,t)) | (s,t) \in w(x,y)\} \qquad \text{Equation 1}$$

$$L(x,y;d) = \lambda_0 \lambda_1 \lambda_2 / \sigma_r^2 \sigma_g^2 \sigma_b^2 \qquad \text{Equation 2}$$

here, $I_{(R)}$, $I_{(G)}$, and $I_{(B)}$ represent red, green, and blue color channel images, respectively, $(s+d,t)$, $(s,t-d)$, and $(s-d,t)$ are shift vectors for each color channel images, $\lambda_0$, $\lambda_1$, and $\lambda_2$ represent the eigenvalues of the covariance matrix $\Sigma$ of the color distribution $P_1(x,y;d)$, respectively, $w(x,y)$ is a local window, and $\sigma_r^2$, $\sigma_g^2$, and $\sigma_b^2$ are the diagonal elements of the covariance matrix $\Sigma$.

3. The apparatus of claim 2, wherein the depth map generation unit generates the depth map by combining the abstract disparity map and a mean-shift segmentation result.

4. The apparatus of claim 1, further comprising:
    a smoothing unit smoothing the fully focused image to enhance image quality.

5. A method for generating a fully focused image, the method comprising:
    (a) generating a depth map of an input image obtained by a multiple color filter aperture (MCA) camera;
    (b) extracting subimages which include objects with same focal distance based on the depth map;
    (c) performing color channel alignment and removing out-of-focus blurs for each subimages obtained from the depth map; and
    (d) fusing the subimages to generate a fully focused image.

6. The method of claim 5, wherein step (a) comprises:
    (a1) establishing a set of pixel colors with hypothesized disparity d as Equation 1 shown below; and
    (a2) searching for d that minimizes an abstract disparity map represented by following Equation 2:

$$P_1(x,y;d) = \{(I_{(R)}(s+d,t), I_{(G)}(s,t-d), I_{(B)}(s-d,t)) | (s,t) \in w(x,y)\} \qquad \text{Equation 1}$$

$$L(x,y;d) = \lambda_0 \lambda_1 \lambda_2 / \sigma_r^2 \sigma_g^2 \sigma_b^2 \qquad \text{Equation 2}$$

here, $I_{(R)}$, $I_{(G)}$, and $I_{(B)}$ represent red, green, and blue color channel images, respectively, $(s+d,t)$, $(s,t-d)$, and $(s-d,t)$ are shift vectors for each color channel images, $\lambda_0$, $\lambda_1$, and $\lambda_2$ represent the eigenvalues of the covariance matrix $\Sigma$ of the color distribution $P_1(x,y;d)$, respectively, $w(x,y)$ is a local window, and $\sigma_r^2$, $\sigma_g^2$, and $\sigma_b^2$ are the diagonal elements of the covariance matrix $\Sigma$.

7. The method of claim 6, wherein step (a) further comprises (a3) generating the depth map by combining the abstract disparity map and a mean-shift segmentation result.

8. The method of claim 5, further comprising:
    (e) smoothing the fully focused image to enhance image quality.

9. A non-transitory computer readable medium storing a program for executing the method for generating a fully focused image according to claim 5 in a computer.

* * * * *